(No Model.)
J. J. SELDNER.
DRIVE CHAIN.
No. 324,734. Patented Aug. 18, 1885.
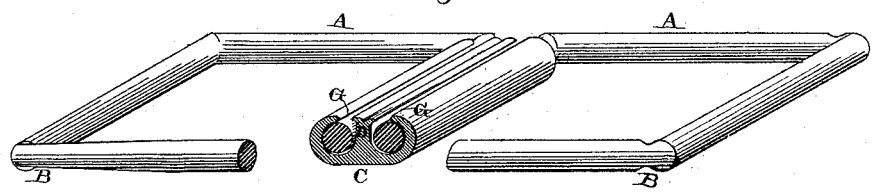
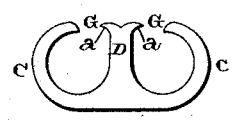
WITNESSES
INVENTOR
Jos. J. Seldner,
per F. A. Lehmann,
Attorney

UNITED STATES PATENT OFFICE.

JOSEPH J. SELDNER, OF BALTIMORE, MARYLAND.

DRIVE-CHAIN.

SPECIFICATION forming part of Letters Patent No. 324,734, dated August 18, 1885.

Application filed December 4, 1884. (No model.)

*To all whom it may concern:*

Be it known that I, JOSEPH J. SELDNER, of Baltimore, in the county of Baltimore and State of Maryland, have invented certain new and useful Improvements in Drive-Chain Links; and I do hereby declare the following to be a full, clear, and exact description of the invention, such as will enable others skilled in the art to which it pertains to make and use it, reference being had to the accompanying drawings, which form part of this specification.

My invention relates to an improvement in drive-chains; and it consists in a coupling for the links of drive-chains, and which is divided by a central partition into two separate and distinct slots, the partition being made the same height as the coupling and provided with flanges upon opposite edges, as will be more fully described hereinafter.

The object of my invention is to provide a coupling for the links of a drive-chain, and which is so constructed that when one of the links is detached from the coupling the coupling will not fall off or become readily detached from the end of the other link, and to produce a stronger and a safer coupling for the links.

Figure 1 is a perspective of a portion of a drive-chain embodying my invention, partly in section. Fig. 2 is a detached view of the coupling by itself.

A represents the links of the drive-chain, and which may be of any size or construction that may be preferred, but which are reduced slightly in thickness at the points B upon one side. These links may either be notched at the points B, or the links may be made tapering from the center down to the end bar, as may be preferred.

The coupling C, by means of which the links are joined together, instead of having but a single slot through which both ends of the links are inserted, as in the usual manner, is here provided with a partition, D, and with a slot or opening, G, upon each side of it. Upon opposite edges of the partition D are formed the flanges $a$, which project over the slot and serve to contract it so that the link A cannot possibly become detached until it is turned into the proper position to bring the contracted part B just opposite the end of the slot G. The partition is formed at the center of the coupling for the purpose of strengthening the coupling at its weakest point, and for the purpose of separating the ends of the links entirely from each other. Where the slot is made large enough to allow the ends of both links to be passed through, the slot must be made larger than is necessary, or the ends of the links must be weakened, for the purpose of allowing both to be joined together by the coupling. Where two separate and distinct slots are made, as here shown, one for each link, in case the coupling is removed from either link the coupling is not liable to drop off of or become readily detached from the other link, as is the case where the slot is made larger than is absolutely necessary.

A coupling having the partition formed at its center in the manner here shown is much stronger than a coupling which has only a single slot, in the usual manner, because the hooks upon the ends of the coupling are not so long, and the coupling is more readily applied to and detached from the links than where the ends of both links have to be passed through the same slot.

Having thus described my invention, I claim—

The combination of the links A, having bars of uniform size and the reduced portions B, and the coupling C, having the central partition D, extending to the top of the coupler, and the two slots G, the partition being provided with the flanges $a$ upon opposite edges for the purpose of contracting the slots, substantially as shown.

In testimony whereof I affix my signature in presence of two witnesses.

JOS. J. SELDNER.

Witnesses:
F. A. LEHMANN.
B. LEWIS BLACKFORD.